United States Patent
Gill

(10) Patent No.: US 7,190,560 B2
(45) Date of Patent: Mar. 13, 2007

(54) SELF-PINNED CPP SENSOR USING FE/CR/FE STRUCTURE

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 356 days.

(21) Appl. No.: 10/780,978

(22) Filed: Feb. 18, 2004

(65) Prior Publication Data

US 2005/0180058 A1 Aug. 18, 2005

(51) Int. Cl.
*G11B 5/39* (2006.01)

(52) U.S. Cl. .................................. 360/324.11

(58) Field of Classification Search ............. 360/324.1, 360/324.11, 324.12, 324.2
See application file for complete search history.

(56) References Cited

U.S. PATENT DOCUMENTS

| | | | | |
|---|---|---|---|---|
| 4,949,039 A | 8/1990 | Grunberg | ..................... | 324/252 |
| 5,018,037 A | 5/1991 | Krounbi et al. | ............. | 360/113 |
| 5,134,533 A | 7/1992 | Friedrich et al. | ........... | 360/113 |
| 5,206,590 A | 4/1993 | Dieny et al. | ................. | 324/252 |
| 5,313,186 A | 5/1994 | Schuhl et al. | ................. | 338/32 |
| 5,341,118 A | 8/1994 | Parkin et al. | ................. | 338/32 |
| 5,408,377 A | 4/1995 | Gurney et al. | ............. | 360/113 |
| 5,508,867 A | 4/1996 | Cain et al. | .................. | 360/113 |
| 5,583,725 A | 12/1996 | Coffey et al. | ............... | 360/113 |
| 5,598,308 A | 1/1997 | Dieny et al. | ................. | 360/113 |
| 5,657,191 A | 8/1997 | Yuan | .......................... | 360/113 |
| 5,661,621 A | 8/1997 | Kobayashi et al. | ......... | 360/113 |
| 5,801,984 A | 9/1998 | Parkin | ........................ | 365/158 |
| 6,023,395 A | 2/2000 | Dill et al. | .................... | 360/113 |
| 6,052,263 A | 4/2000 | Gill | ............................ | 360/113 |
| 6,105,237 A | 8/2000 | Gill | ......................... | 29/603.08 |
| 6,159,593 A | 12/2000 | Iwasaki et al. | ............. | 428/332 |
| 6,271,998 B1 | 8/2001 | Coehoorn et al. | ....... | 360/324.2 |
| 6,313,973 B1 | 11/2001 | Fuke et al. | .............. | 360/324.1 |
| 6,341,053 B1 | 1/2002 | Nakada et al. | ........... | 360/324.2 |
| 6,515,573 B1 | 2/2003 | Dong et al. | .................... | 338/32 |
| 6,603,642 B1 | 8/2003 | Araki et al. | ................ | 360/324 |

(Continued)

FOREIGN PATENT DOCUMENTS

JP 7221363 8/1995

(Continued)

OTHER PUBLICATIONS

Gijs, M. et al., "Perpendicular giant magnetoresistance of microstructures in Fe/Cr and Co/Cu multilayers (invited)", J.Appl. Phys, vol. 75, No. 10, May 15, 1994.

(Continued)

*Primary Examiner*—William J Klimowicz
(74) *Attorney, Agent, or Firm*—Zilka-Kotab, PC

(57) ABSTRACT

A magnetic head having a free layer, an antiparallel (AP) pinned layer structure spaced apart from the free layer, and a high coercivity structure positioned towards the AP pinned layer structure on an opposite side thereof relative to the free layer. The high coercivity structure pins a magnetic orientation of the AP pinned layer structure. The AP pinned layer structure includes at least two Fe-containing pinned layers having magnetic moments that are self-pinned antiparallel to each other, the pinned layers being separated by an AP coupling layer of Cr.

21 Claims, 6 Drawing Sheets

U.S. PATENT DOCUMENTS

| | | |
|---|---|---|
| 6,608,738 B2 | 8/2003 | Sakakima et al. ...... 360/324.11 |
| 6,831,816 B2 * | 12/2004 | Gill ........................ 360/324.12 |
| 6,838,740 B2 * | 1/2005 | Huai et al. .................. 257/421 |
| 2001/0012187 A1 | 8/2001 | Lai et al. ................ 360/324.11 |
| 2002/0048128 A1 | 4/2002 | Kamiguchi et al. ...... 360/324.1 |
| 2002/0051380 A1 | 5/2002 | Kamiguchi et al. ......... 365/158 |
| 2002/0085323 A1 | 7/2002 | Smith et al. ........... 360/324.12 |
| 2002/0101691 A1 | 8/2002 | Zhu ........................... 360/324 |
| 2002/0154457 A1 | 10/2002 | Horng et al. .......... 360/324.12 |
| 2003/0011944 A1 | 1/2003 | Hosomi ................... 360/324.1 |
| 2003/0030945 A1 | 2/2003 | Heinonen et al. ........ 360/324.2 |
| 2003/0035256 A1 | 2/2003 | Hayashi et al. ........ 360/324.12 |
| 2003/0039081 A1 | 2/2003 | Seigler et al. ......... 360/324.12 |
| 2003/0137784 A1 | 7/2003 | Noma ................... 360/324.11 |
| 2003/0151859 A1 * | 8/2003 | Hayashi et al. .......... 360/324.2 |
| 2003/0161077 A1 | 8/2003 | Kawawake et al. ...... 360/324.1 |
| 2003/0227724 A1 | 12/2003 | Li et al. ................ 360/324.12 |
| 2004/0008454 A1 * | 1/2004 | Gill ........................ 360/324.12 |
| 2004/0246776 A1 | 12/2004 | Covington .................. 365/173 |
| 2005/0111148 A1 * | 5/2005 | Li et al. ................ 360/324.12 |
| 2005/0122635 A1 | 6/2005 | Freitag et al. ......... 360/324.11 |

FOREIGN PATENT DOCUMENTS

| | | |
|---|---|---|
| JP | 2001274477 | 10/2001 |

OTHER PUBLICATIONS

Herper, H. et al., "Ab initio study of CPP transport in Fe/CR/Fe trilayers: influence of transition metal impurities", Mat. Res. Soc. Symp. Proc. vol. 746, 2003.

Mathon, J., "Ab initio calculation of the perpendicular giant magnetoresistance of finite Co/Cu(001) and Fe/Cr(001) superlattices with fluctuating layer thickness", Physical Review B, vol. 55, No. 2, Jan. 1, 1997.

Parkin, S., "Oscillations in Exchange Coupling and Magnetoresistance in Metallic Superlattice Structures: Co/Ru, Co/Cr, and Fe/Cr", Physical Review Letters, vol. 64, No. 19, May 7, 1990.

Wu, Yihong et al, "Antiferromagnetically coupled hard/Ru/soft layers and their applications in spin valves", Applied Physics Letters, vol. 80, No. 23, Jun. 10, 2002.

Seigler, Michael A. et al., "Use of a permanent magnet in the synthetic antiferromagnet of a spin-valve", Journal of Applied Physics, vol. 91, No. 4, Feb. 15, 2002.

Office Action from U.S. Appl. No. 10/781,232 mailed Jul. 6, 2006.

Copy of Final Office Action Summary from application no. 10/781,232 which was mailed on Nov. 14, 2006.

* cited by examiner

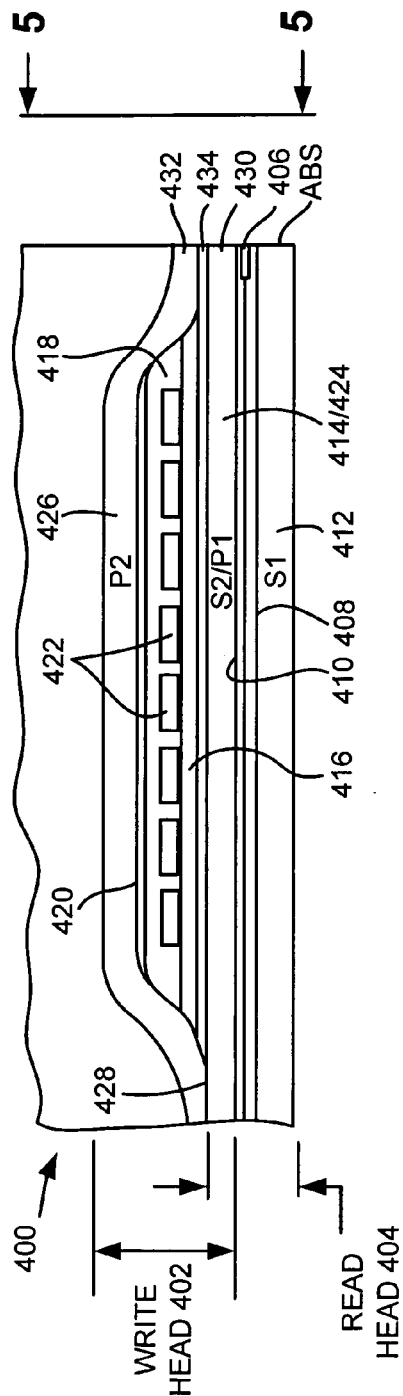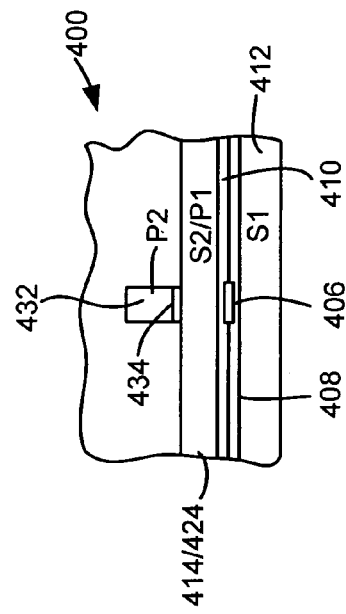

SELF-PINNED CPP SENSOR USING FE/CR/FE STRUCTURE

RELATED APPLICATION

This application is related to a U.S. patent application filed concurrently herewith entitled "High Hc Reference Layer Structure for Self-Pinned GMR Heads" by the same inventor and assigned to a common assignee, the Patent Application being herein incorporated by reference.

FIELD OF THE INVENTION

The present invention relates to magnetic heads, and more particularly, this invention relates to sensors having Fe/Cr/Fe structures.

BACKGROUND OF THE INVENTION

The heart of a computer is a magnetic disk drive which includes a rotating magnetic disk, a slider that has read and write heads (also called writers and sensors), a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1A shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

FIG. 1B shows another prior art SV sensor 150 with a flux keepered configuration. The SV sensor 150 is substantially identical to the SV sensor 100 shown in FIG. 1A except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al. discloses a SV sensor having a flux keepered configuration.

U.S. patent application Pub. No. 2003/0161077 A1 to Kawawake et al. discloses a structure that uses a Fe/Cr/Fe type spin valve structure and an AFM layer as a magnetization rotation suppression layer. As disclosed therein, the Fe/Cr/Fe type spin valve provides a large change in resistance, which in turn translates into greater signal.

Another type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-Pinned SV sensor provides improved exchange coupling of the antiferromagnetic (AFM) layer to the laminated pinned layer structure than is achieved with the pinned layer structure of the SV sensor of FIG. 1A. This improved exchange coupling increases the stability of the AP-Pinned SV sensor at high temperatures which allows the use of corrosion resistant antiferromagnetic materials such as NiO for the AFM layer.

Referring to FIG. 2, an AP-Pinned SV sensor 200 typically comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling layer (APC) 224 of nonmagnetic material. The two ferromagnetic layers 226, 222 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

As mentioned above, AP-Pinned SV sensors typically use an AFM layer in order to pin the magnetization so that the pinned layers do not move around when the head is reading data from the disk, upon application of external magnetic fields, etc. The AFM layers are typically very thick, on the order of 150–200 Å. Due to the large overall thickness, such sensors are typically not practical for use in applications where a thin head is desirable.

What is needed is a self-pinned AP-Pinned SV sensor having the signal benefits provided by Fe/Cr/Fe structures while having a smaller overall thickness.

SUMMARY OF THE INVENTION

The present invention provides the advantages described above by providing a magnetic head having a free layer, an antiparallel (AP) pinned layer structure spaced apart from the free layer, and a high coercivity structure positioned towards the AP pinned layer structure on an opposite side thereof relative to the free layer. The high coercivity structure pins a magnetic orientation of the AP pinned layer structure.

The AP pinned layer structure includes at least two Fe-containing pinned layers having magnetic moments that are self-pinned antiparallel to each other, the pinned layers being separated by an AP coupling layer of Cr.

In a preferred embodiment, the high coercivity structure includes a layer of CoPtCr or other high coercivity material. The CoPtCr is preferably formed directly on one of the Fe-containing pinned layers of the AP pinned layer structure to avoid the necessity of any amorphous seed layer.

In one embodiment, the free layer includes a layer of Fe. The free layer may also be a multi-layer stack, e.g., further including a layer of NiFe.

The structure preferably includes a spacer layer of Cr positioned between the free layer and the AP pinned layer structure. A head as recited in claim 1, wherein the high coercivity layer is formed of CoPtCr.

The head described herein may form part of a GMR head, a CPP GMR sensor, a CPP tunnel valve sensor, etc. for use in a magnetic storage system.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a partial view of the slider and a merged magnetic head.

FIG. 5 is a partial ABS view, not to scale, of the slider taken along plane 5—5 of FIG. 4 to show the read and write elements of the merged magnetic head.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1A:
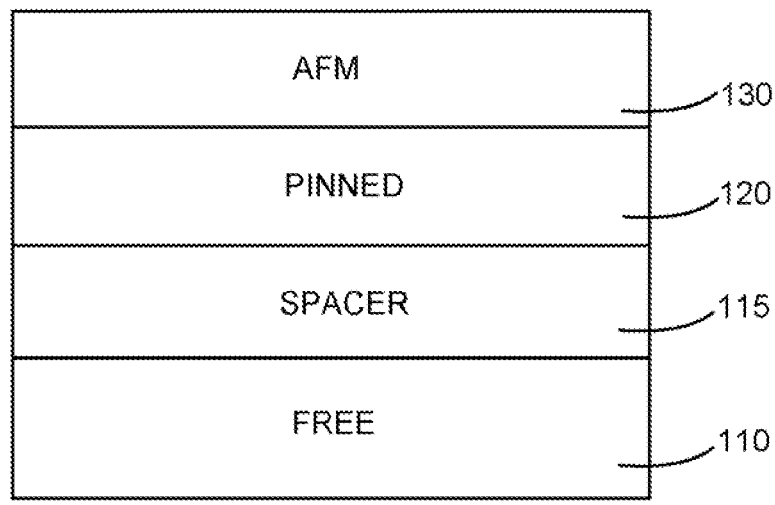
FIG. 1A is an air bearing surface view, not to scale, of a prior art spin valve (SV) sensor.
Figure 1B:
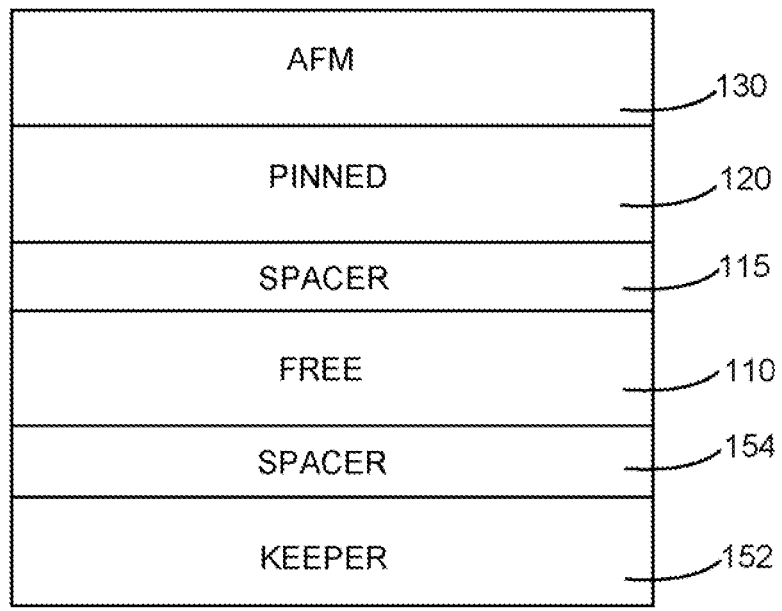
FIG. 1B is an air bearing surface view, not to scale, of a prior art keepered SV sensor.
Figure 2:
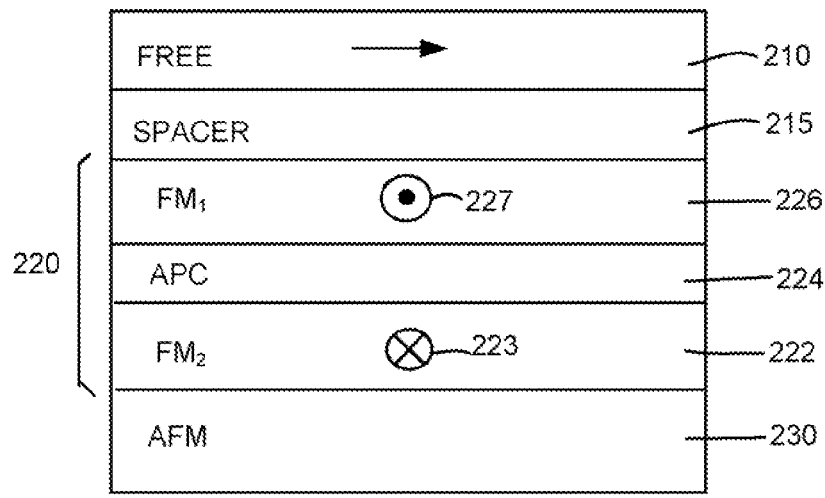
FIG. 2 is an air bearing surface view, not to scale, of a prior art AP-Pinned SV sensor.
Figure 3:
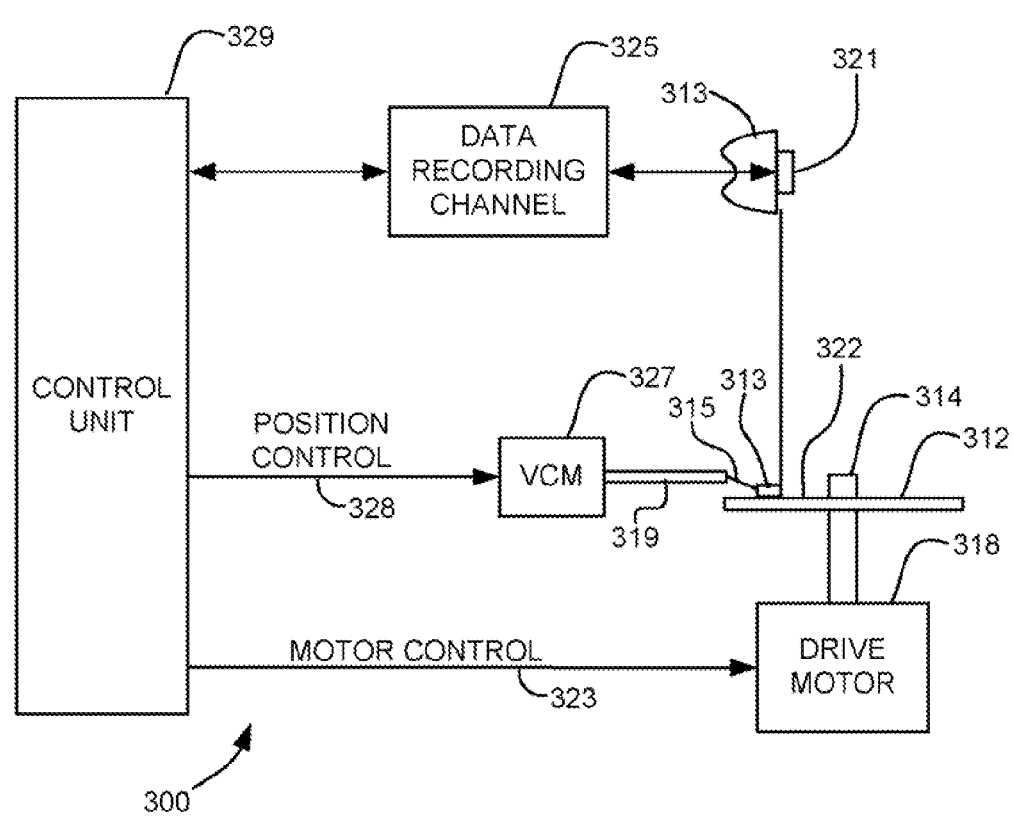
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
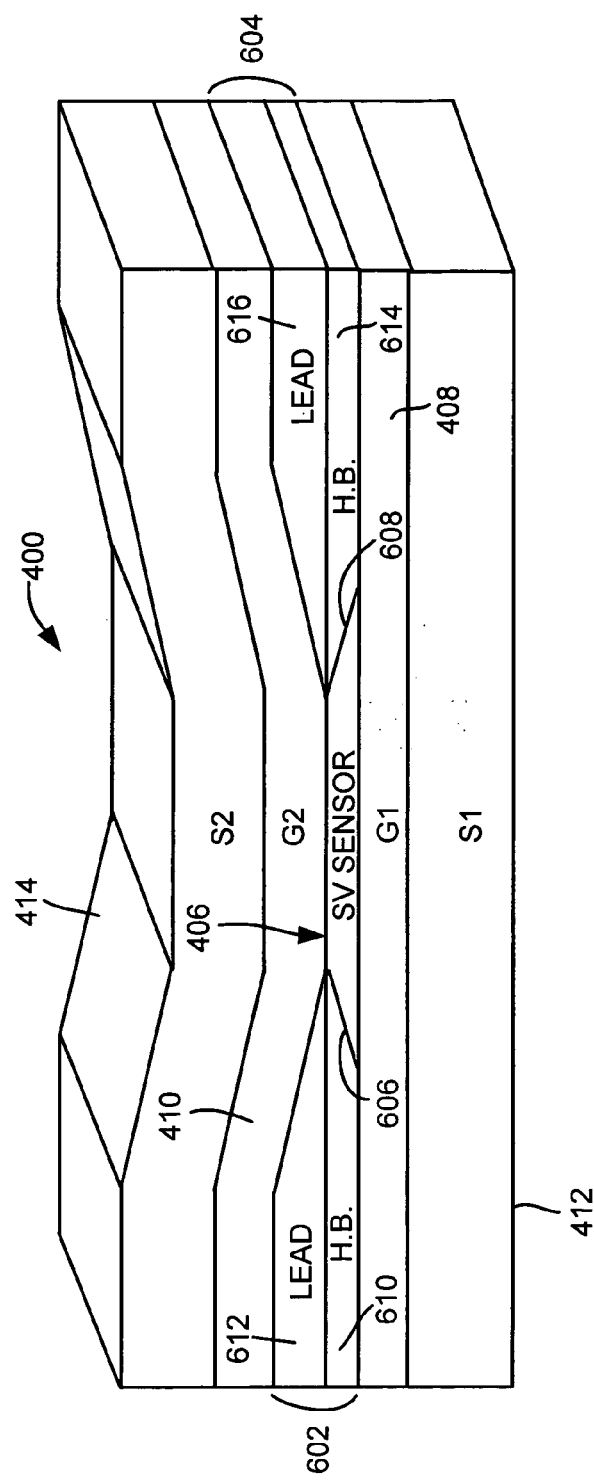
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. First and second hard bias and lead layers 602 and 604 are connected to first and second side edges 606 and 608 of the spin valve sensor. This connection is known in the art as a contiguous junction and is fully described in U.S. Pat. No. 5,018,037 which is incorporated by reference herein. The first hard bias and lead layers 602 include a first hard bias layer 610 and a first lead layer 612 and the second hard bias and lead layers 604 include a second hard bias layer 614 and a second lead layer 616. The hard bias layers 610 and 614 cause magnetic fields to extend longitudinally through the spin valve sensor 406 for stabilizing the magnetic domains therein. The spin valve sensor 406 and the first and second hard bias and lead layers 602 and 604 are located between the nonmagnetic electrically insulative first and second read gap layers 408 and 410. The first and second read gap layers 408 and 410 are, in turn, located between the ferromagnetic first and second shield layers 412 and 414.

The present invention provides a new sensor structure having a thinner pinned structure together with reduced current shunting to optimize dr/R. Many types of heads can use the structure described herein, and the structure is particularly adapted to a CPP GMR sensor and a CPP tunnel valve sensor. In the following description, the width of the layers (W) refers to the track width. The sensor height is in a direction into the face of the paper. Unless otherwise described, thicknesses of the individual layers are taken perpendicular to the plane of the associated layer, and are provided by way of example only and may be larger and/or smaller than those listed. Similarly, the materials listed herein are provided by way of example only, and one skilled in the art will understand that other materials may be used without straying from the spirit and scope of the present invention.

CPP GMR

Figure 7:
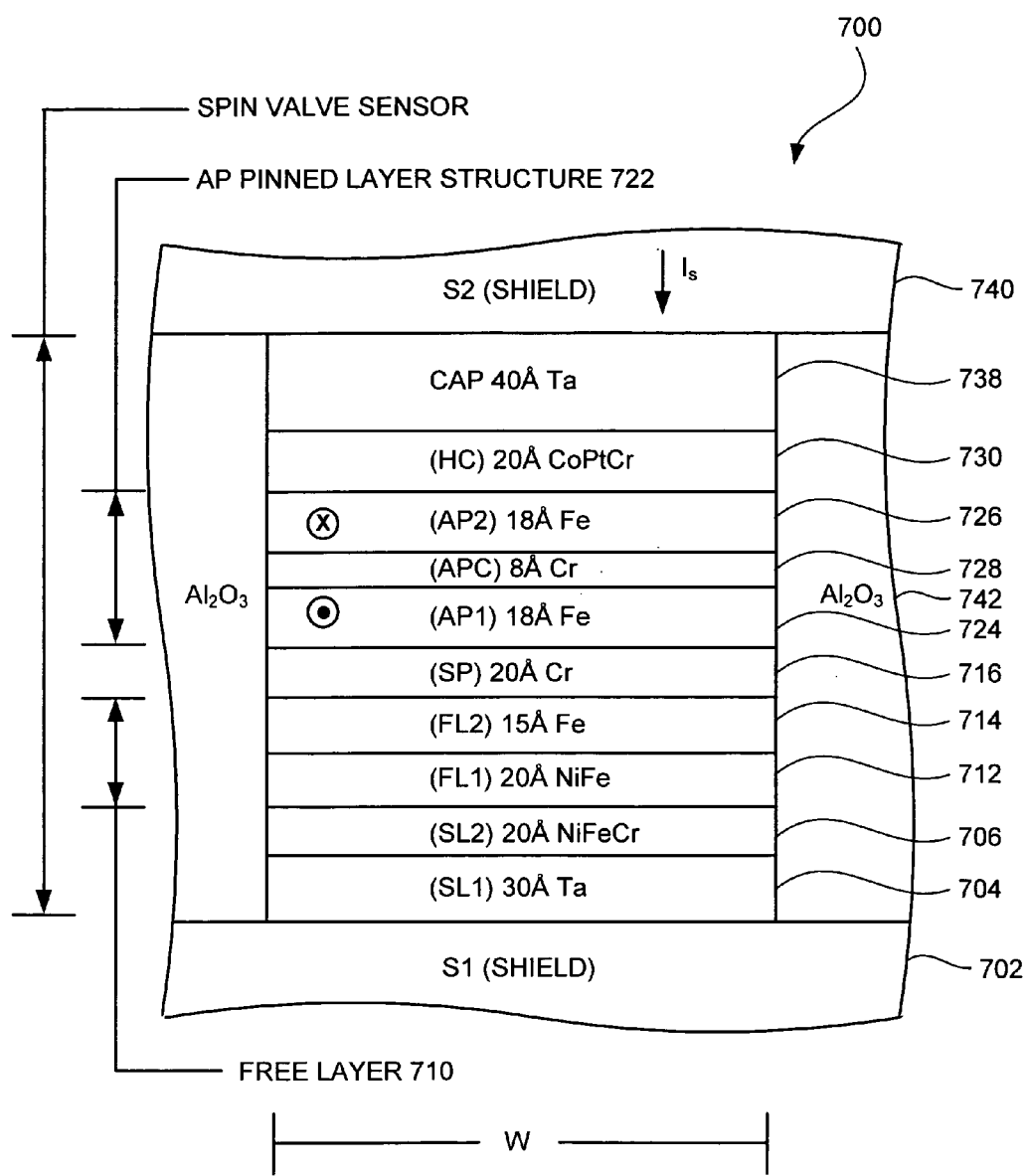
FIG. 7 is an ABS illustration of a CPP GMR sensor, not to scale, according to an embodiment of the present invention.

FIG. 7 depicts an ABS view of a CPP GMR sensor 700 according to one embodiment. "CPP" means that the sensing current ($I_s$) flows from one shield to the other shield in a direction perpendicular to the plane of the layers forming the sensor 700.

As shown in FIG. 7, a first shield layer (S1) 702 is formed on a substrate (not shown). The first shield layer 702 can be of any suitable material, such as permalloy (NiFe).

Seed layers are formed on the first shield layer 702. The seed layers aid in creating the proper growth structure of the layers above them. Illustrative materials formed in a stack from the first shield layer 702 are a layer of Ta (SL1) 704 and a layer of NiFeCr (SL2) 706. Illustrative thicknesses of these materials are Ta (30 Å), NiFeCr (20 Å). Note that the stack of seed layers can be varied, and layers may be added or omitted based on the desired processing parameters.

A free layer (FL) 710 is formed above the seed layers 704–708. The magnetic moment of the free layer 710 is soft and so is susceptible to reorientation from external magnetic forces, such as those exerted by data on disk media. The relative motion of magnetic orientation of the free layer 710 when affected by data bits on disk media creates variations in the sensing current flowing through the sensor 700, thereby creating the signal. Preferred materials for the free layer 710 are a NiFe/Fe stack (FL1, FL2) 712, 714, but can also be formed of a CoFe/Fe stack, a CoFe/NiFe/Fe stack, etc. An illustrative thickness of the free layer 710 is about 10–40 Å.

The magnetic orientation of the free layer 710 must be preset during manufacture, otherwise the orientation will be unstable and could move around at random, resulting in a "scrambled" or noisy signal. This instability is a fundamental property of soft materials, making them susceptible to any external magnetic perturbations. Thus, the magnetic orientation of the free layer 710 should be stabilized so that when its magnetic orientation moves, it consistently moves around in a systematical manner rather than a random manner. The magnetic orientation of the free layer 710 should also be stabilized so that it is less susceptible to reorientation, i.e., reversing. Usually hard magnet layers (not shown) are placed adjacent to the edges of the free layer 710 to stabilize the free layer.

A spacer layer (SP) 716 is formed above the free layer 710. The spacer layer 716 is preferably formed of Cr. An exemplary thickness of the spacer layer 716 is about 10–30 Å, more preferably about 15–25 Å, and ideally about 20 Å.

Then an antiparallel (AP) pinned layer structure 722 is formed above the spacer layer 716. As shown in FIG. 7, first and second AP pinned magnetic layers, (AP1) and (AP2) 724, 726, are separated by a thin layer of an antiparallel coupling (APC) material 728 such that the magnetic moments of the AP pinned layers 724, 726 are self-pinned antiparallel to each other. The pinned layers 724, 726 have a property known as magnetostriction. The magnetostriction of the pinned layers 724, 726 is very positive. The sensor 700 is also under compressive stresses because of its geometry at the ABS, and the configuration of the layer is such that it produces very large compressive stress. The combination of positive magnetostriction and compressive stress causes the pinned layers 724, 726 to develop a magnetic anisotropy that is in a perpendicular direction to the track width. This magnetic coupling through the AP coupling material 728 causes the pinned layers 724, 726 to have antiparallel-oriented magnetizations.

In the embodiment shown in FIG. 7, the preferred magnetic orientation of the pinned layers 724, 726 is for the first pinned layer 724, into the face of the structure depicted (perpendicular to the ABS of the sensor 700), and out of the face for the second pinned layer 726. The pinned layers 724, 726 are formed of an Fe-containing material, preferably substantially pure Fe, separated by an antiparallel coupling layer 728 of Cr. Illustrative thicknesses of the first and second pinned layers 724, 726 are between about 10 Å and 25 Å. The Cr layer 728 can be about 5–15 Å, but is preferably selected to provide a saturation field above about 10 KOe. In a preferred embodiment, each of the pinned layers 724, 726 is about 18 Å with a Cr layer 728 therebetween of about 8 Å.

In typical heads, the AP pinned layer structure 722 is stabilized by placement of an antiferromagnetic (AFM) layer above the pinned layer structure 722. The AFM layer pins the AP pinned layer structure 722 so that the pinned layers 724, 726 do not move around when disk is reading data from disk, upon application of external magnetic fields, etc. However, as mentioned above, AFM layers are very thick, typically about 150–200 Å. If the designer wants to fit the sensor into small gap, use of thick AFM layers is not practical.

To reduce the overall thickness of the sensor 700 while providing the desired stabilizing effect, a high coercivity layer 730 is formed above the pinned layer structure 722. The high coercivity layer 730 pins the magnetic orientation of the second pinned layer 726, stabilizing the overall pinned layer structure 722.

The preferred material for the high coercivity layer 730 is CoPtCr, though other hard magnet materials can also be used. CoPtCr has a coercivity of greater than about 1000 Oe, and is sometimes used in hard disk media. This high coercivity pins the second pinned layer 726. A preferred thickness of the high coercivity layer 730 is about 10–50 Å, ideally about 30 Å.

CoPtCr has a crystalline structure. Because the CoPtCr layer 730 is formed on the second pinned layer 726 of Fe, no seed layer is necessary to obtain proper physical growth of CoPtCr structure. This further reduces the thickness of the overall sensor 700.

A cap (CAP) 738 is formed above the high coercivity layer 736. Exemplary materials for the cap 738 are Ta, Ta/Ru stack, etc. An illustrative thickness of the cap 738 is 20–40 Å.

A second shield layer (S2) 740 is formed above the cap 738. An insulative material 742 such as $Al_2O_3$ is formed on both sides of the sensor 700.

The inventor has found that the structure disclosed herein provides about ten times the magnetoresistance of a Co/Cr/Co CPP structure.

Note that in some embodiments, the first pinned layer 724 (e.g., of Fe) generates magnetoresistance with the Cr spacer layer 716. Because magentoresistance is a function of magnetic thickness, and because the second pinned layer 726 (e.g., of Fe) and the high coercivity layer 730 above it are magnetic, it is desirable to obtain a total magnetic thickness of the second pinned layer 726 and the high coercivity layer 730 comparable to that of the first pinned layer 724. Thus, the second pinned layer 726 is preferably thinner than the first pinned layer 724 to reduce canceling of the magnetoresistive signal by the second pinned layer 726. This results in a larger net magnetoresistive signal.

One practicing the invention can determine the appropriate magnetic thickness of the layers using the following equation:

$$\text{Magnetic thickness} = M \times T \quad \text{Equation 1}$$

where:
  M=magnetization=magnetic moment per unit volume ($emu/cm^3$);
  T=physical thickness (cm); and
  emu=electromagnetic unit.

CPP Tunnel Valve

Figure 8:
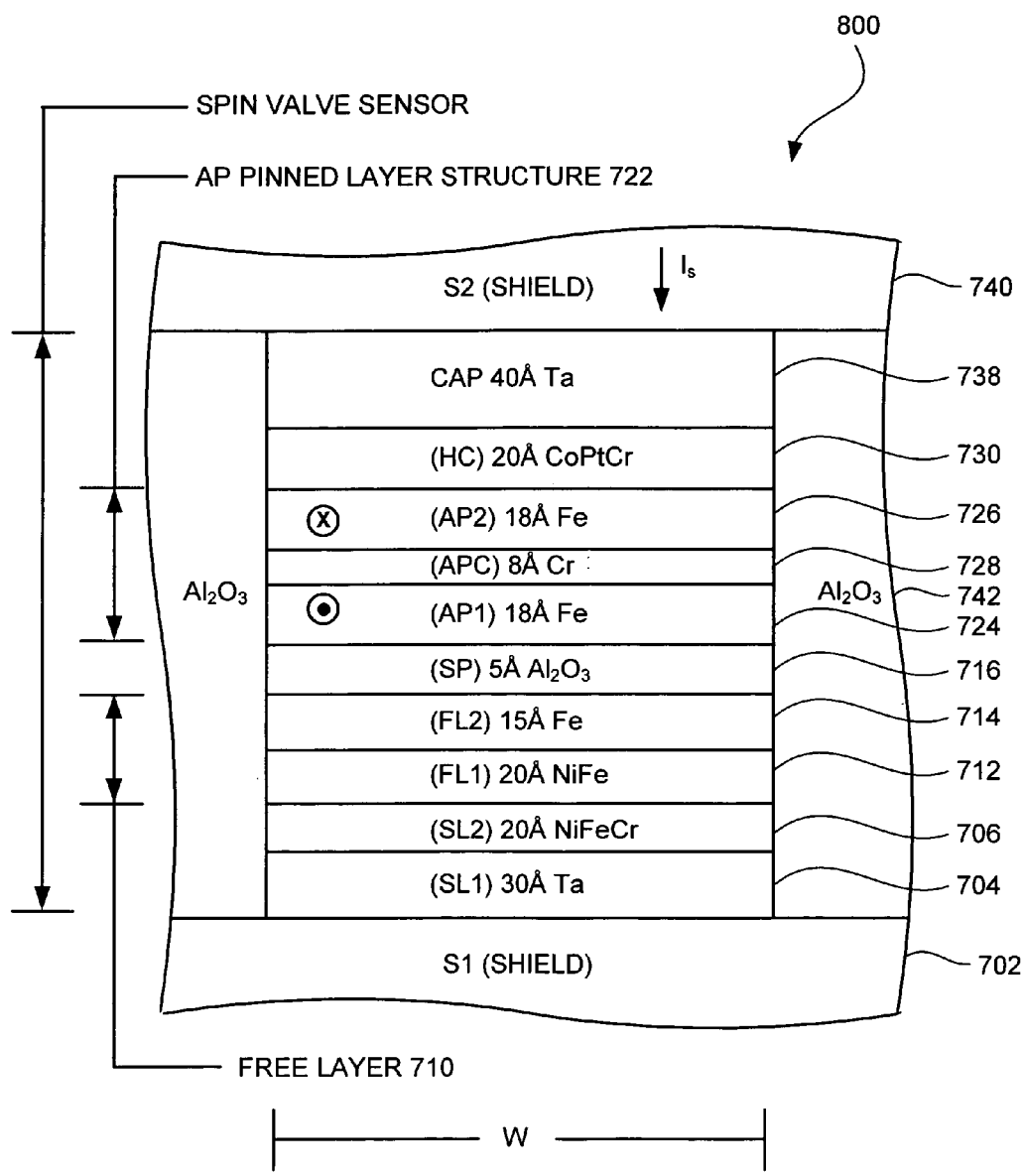
FIG. 8 is an ABS illustration of a CPP tunnel valve sensor, not to scale, according to an embodiment of the present invention.

FIG. 8 depicts an ABS view of a CPP tunnel valve sensor 800 according to one embodiment. The CPP tunnel valve sensor 800 generally has the same configuration as the structure shown in FIG. 7, except that the spacer layer 716 is formed of a dielectric barrier material, such as, $Al_2O_3$, $AlO_x$, $MgO_x$, etc. The spacer layer 716 is very thin such that the electric current passing through the sensor 800 "tunnels" through the spacer layer 716. An illustrative thickness of the spacer layer 716 is 3–6 Å.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head, comprising:
    a free layer;
    an antiparrallel (AP) pinned layer structure spaced apart from the free layer, the AP pinned layer structure includes at least two substantially pure Fe pinned layers having magnetic moments that are self-pinned antiparallel to each other, the pinned layers being separated by an AP coupling layer of Cr; and
    a high coercivity layer positioned towards the AP pinned layer structure on an opposite side thereof relative to the free layer, the high coercivity structure pinning a magnetic orientation of the AP pinned layer structure.

2. A head as recited in claim 1, wherein the free layer includes a layer of substantially pure Fe.

3. A head as recited in claim 2, wherein the free layer further includes a layer of NiFe.

4. A head as recited in claim 1, further comprising, a spacer layer of Cr positioned between the free layer and the AP pinned layer structure.

5. A head as recited in claim 4, wherein the spacer layer has a thickness of between about 15 and 25 Å.

6. A head as recited in claim 1, wherein the head forms part of a GMR head.

7. A head as recited in claim 1, wherein the head forms part of a CPP GMR sensor.

8. A head as recited in claim 1, wherein the head forms part of a tunnel valve sensor.

9. A magnetic storage system comprising:
magnetic media;
at least one head for reading from and writing to the magnetic media, each head having:
a sensor having the structure recited in claim 1,
a writer coupled to the sensor;
a slider for supporting the head; and
a control unit coupled to the head for controlling operation of the head.

10. A magnetic head comprising:
a free layer;
an antiparallel (AP) pinned layer structure spaced apart from the free layer, the AP pinned layer structure includes at least two Fe-containing pinned layers having magnetic moments that are self-pinned antiparallel to each other, the pinned layers being separated by an AP coupling layer of Cr; and
a high coecivity layer positioned towards the AP pinned layer structure on an opposite side thereof relative to the free layer, the high coercivity structure pinning a magnetic orientation of the AP pinned layer structure, wherein the high coercivity layer is formed of CoPtCr.

11. A head as recited in claim 10, wherein the CoPtCr is formed directly on one of the Fe-containing pinned layers of the AP pinned layer structure.

12. A magnetic head, comprising:
a free layer, the free layer including a layer of Fe;
an antiparallel (AP) pinned layer structure spaced apart from the free layer, the AP pinned layer structure includes at least two Fe-containing pinned layers having magnetic moments that are self-pinned antiparallel to each other, the pinned layers being separated by an AP coupling layer of Cr, wherein one of the pinned layers is thicker than another of the pinned layers;
a spacer layer of Cr positioned between the free layer and AP pinned layer structure; and
a high coercivity layer positioned towards the AP pinned layer structure on an opposite side thereof relative to the free layer, the high coercivity structure pinning a magnetic orientation of the AP pinned layer structure.

13. A lead as recited in claim 12, wherein the free layer further includes a layer of NiFe.

14. A head as recited in claim 12, wherein the layer of Fe in the free layer is substantially pure Fe.

15. A head as recited in claim 12, wherein the spacer layer has a thickness of between about 15 and 25 Å.

16. A head as recited in claim 12, wherein the head forms part of a GMR head.

17. A head as recited in claim 12, wherein the head forms part of a CPP GMR sensor or a tunnel valve sensor.

18. A head as recited in claim 12, wherein a total magnetic thickness of one of the pinned layers and the high coercivity layer combined is about the same as a magnetic thickness of another of the pinned layers.

19. A magnetic storage system, comprising:
magnetic media;
at least one head for reading from and writing to the magnetic media, each head having:
a sensor having the structure recited in claim 12;
a writer coupled to the sensor;
a slider for supporting the head; and
a control unit coupled to the head for controlling operation of the head.

20. A magnetic head comprising:
a free layer, the free layer including a layer of Fe;
an antiparallel (AP) pinned layer structure spaced apart from the free layer, the AP pinned layer structure includes at least two Fe-containing pinned layers having magnetic moments that are self-pinned antiparallel to each other, the pinned layers being separated by an AP coupling layer of Cr;
a spacer layer of Cr positioned between the free layer and AP pinned layer structure; and
a high coercivity layer positioned towards the AP pinned layer structure on an opposite side thereof relative to the free layer, the high coercivity structure pinning a magnetic orientation of the AP pinned layer structure, wherein the high coercivity layer is formed of CoPtCr.

21. A head as recited in claim 20, wherein the CoPtCr is formed directly on one of the Fe-containing pinned layers of the AP pinned layer structure.

* * * * *

UNITED STATES PATENT AND TRADEMARK OFFICE
CERTIFICATE OF CORRECTION

PATENT NO.        : 7,190,560 B2
APPLICATION NO. : 10/780978
DATED             : March 13, 2007
INVENTOR(S)       : Gill It is certified that error appears in the above-identified patent and that said Letters Patent is hereby corrected as shown below:

In the claims:
col. 8, line 41 change "antiparrallel" to --antiparallel--;
col. 8, line 56 change "further comprising, a" to --further comprising a--;
col. 9, line 18 change "coecivity" to --coercivity--;
col. 9, line 41 change "lead" to --head--.

Signed and Sealed this

Eighth Day of May, 2007

JON W. DUDAS
*Director of the United States Patent and Trademark Office*